United States Patent [19]

Pettman

[11] Patent Number: 4,848,956
[45] Date of Patent: Jul. 18, 1989

[54] SECURING MEANS

[75] Inventor: Nigel R. A. Pettman, Solihull, United Kingdom

[73] Assignee: Burn Tubes Limited, West Midlands, United Kingdom

[21] Appl. No.: 16,940

[22] Filed: Feb. 20, 1987

[30] Foreign Application Priority Data

Feb. 21, 1986 [GB] United Kingdom ............... 8604387
Mar. 10, 1986 [GB] United Kingdom ............... 8605841

[51] Int. Cl.$^4$ ............................................. B25G 3/16
[52] U.S. Cl. ................................. 403/349; 403/350; 403/343
[58] Field of Search ............... 403/348, 349, 350, 351, 403/343

[56] References Cited

U.S. PATENT DOCUMENTS

| | | | |
|---|---|---|---|
| 827,267 | 7/1906 | Schmidt | 403/350 |
| 1,844,382 | 2/1932 | Dardelet | 403/350 X |
| 2,122,244 | 6/1938 | Brown | 403/350 X |
| 3,419,293 | 12/1968 | Conrad | 403/351 |
| 4,231,574 | 11/1980 | Williams | 403/350 X |
| 4,373,828 | 2/1983 | Sartori | 403/348 X |
| 4,619,549 | 10/1986 | Gilbreth | 403/349 |
| 4,668,119 | 5/1987 | Galletti | 403/349 |

FOREIGN PATENT DOCUMENTS

| | | |
|---|---|---|
| 895505 | 11/1958 | United Kingdom . |
| 907344 | 11/1960 | United Kingdom . |
| 1137912 | 1/1965 | United Kingdom . |
| 1330401 | 3/1971 | United Kingdom . |
| 1404735 | 1/1974 | United Kingdom . |
| 2134965 | 12/1983 | United Kingdom . |

Primary Examiner—Andrew V. Kundrat
Attorney, Agent, or Firm—Parmelee, Miller, Welsh & Kratz

[57] ABSTRACT

A connector for securing together first and second members, the first member being elongate and having a generally central longitudinal axis, the second member having a socket, a locking element secured relative to or integral with the first member, the locking element having a first engagement surface and being receivable in the socket, the surface, upon less than one revolution of the first member about the longitudinal axis, relative to the second member, being urged into contact with a second engagement surface of the socket to ensure the first and second members together.

14 Claims, 5 Drawing Sheets

SECURING MEANS

BACKGROUND OF THE INVENTION

This invention relates to a securing means for securing together two members, and more particularly, but not exclusively, to a securing means for securing one member comprising a tool head such as a broom head, mop head or rake or other tool head, to a second member comprising an elongate handle such as is commonly referred to as a "broom handle". However the invention has much wider application as will become apparant from the description below.

A tool head is usually provided with a socket which conventionally is a generally cylindrical bore in the tool head or may be provided by a socket extension part extending from the tool head. In each case, at present it is necessary once the handle has been inserted into the socket, to nail, screw, glue, or otherwise affix the handle to the socket.

SUMMARY OF THE INVENTION

According to one aspect of the invention we provide a securing means for securing together first and second members, the first member being elongate and having a generally central longitudinal axis, the second member having a socket, a locking element secured relative to or integral with the first member, the locking element having a first engagement surface and being receivable in the socket, the surface, upon less than one revolution of the first member about the longitudinal axis, relative to the second member, being urged into contact with a second engagement surface of the socket to secure the first and second members together.

Thus using such a securing means, there is no need to nail, screw or glue a handle within a socket of a tool head.

The first engagement surface may be urged into engagement with the second engagement surface upon a relative rotation of less than 180°, and preferably upon a relative rotation of not more than 90°, in one or other direction.

In a first embodiment, the locking element comprises a first generally cylindrical part having an elongate axis spaced from the longitudinal axis of the first member, and a further generally cylindrical part whose axis is maintained in alignment with the axis of the first member during relative rotation, the first engagement surface comprising part of the cylindrical surface of the first cylindrical part which comprises a cam and engages the engagement surface of the socket which is provided by an inside, generally cylindrical surface of the socket, upon relative rotation of the first and second members.

The socket may comprise a first generally cylindrical socket opening which receives the further generally cylindrical part of the locking element, the longitudinal axis of the opening being maintained in alignment with the axis of the first member during relative rotation, and a second generally cylindrical socket opening having a longitudinal axis spaced from the longitudinal axis of the first socket opening, the second socket opening receiving the first generally cylindrical part of the locking element and providing the second engagement surface.

The locking element itself, and particularly the further cylindrical part thereof, may engage with the socket to maintain the longitudinal axes of the first socket opening and the further cylindrical part in alignment during relative rotation of the first and second members and/or a part of the first member adjacent the locking element may be received in the first socket opening and may assist in maintaining the axes in alignment.

Preferably, the longitudinal axis of the second socket opening is aligned with or close to the longitudinal axis of the first generally cylindrical part of the locking element prior to the first and second members being relatively rotated, the axes of the second socket opening and the first generally cylindrical part of the locking element being moved apart, or further apart, during relative rotation of the first and second members so that the cam surface moves outwardly.

If desired, in the embodiment specified, in addition to the engagement between the first and second engagement surfaces which exerts a force resistant to withdrawal of the locking element from the socket, in a direction transverse to the longitudinal axis of the first member, means are provided to exert a force in a direction generally parallel to the longitudinal axis of the first member.

It has been found that with an arrangement such as the first embodiment specified, there is a tendency as the first and second members are relatively rotated, for the locking element to move axially in the socket out of the socket. A means to exert a force parallel to the longitudinal axis of the first member to prevent this, is therefore desirable. For example, in one arrangement, the cam surface or the second engagement surface comprises at least one projection which extends outwardly or inwardly respectively, relative to the longitudinal axis of the first generally cylindrical part, which projection is received in a corresponding groove in the second engagement surface or the cam surface respectively as the first and second members are relatively rotated. This interengagement between the projection, or projections and the groove or grooves, thus resists withdrawal of the locking element from the socket, during relative rotation of the first and second members.

In another, preferred arrangement, the locking element comprises an abutment longitudinally spaced from the cam surface, the abutment projecting outwardly of the locking element where it is provided, and the inside surface of the socket having, in a position corresponding to the position of the abutment prior to relative rotation of the first and second members, a longitudinally extending groove to enable the first cylindrical part of the locking element to be received in the second socket opening, and the socket providing a recess longitudinally spaced from the first socket opening and communicating with the groove to receive the abutment when the first cylindrical part is received in the second socket opening, whereby upon said relative rotation of the first and second members, the abutment becomes misaligned with the groove.

In addition, the socket, between the second socket opening and the recess, may provide an auxiliary cam surface with which the abutment engages during relative rotation of the first and second members to urge the locking element inwardly of the socket and to resist movement of the locking element outwardly of the socket during relative rotation.

As the locking element is urged inwardly of the socket, a shoulder between first and second cylindrical parts of the locking element will thus be urged into increasingly tight engagement with a radially inwardly extending formation of the socket between the first and second socket openings during the relative rotation between the first and second members, by virtue of the engagement between the auxiliary cam surface and the abutment.

In each case, the cam surface and the second engagement surface of the socket may be slightly tapered for example at an angle of 3° or less, preferably about ½°, relative to the longitudinal axis of the respective first cylindrical part and second socket opening, to provide an undercut to retain the cam surface.

In another embodiment, the locking element may have a first part comprising an abutment which extends generally transversly to the central longitudinal axis of the first member, and a second generally cylindrical part, an intermediate formation connecting the first and second parts, the socket comprising a first generally cylindrical socket opening which receives the second generally cylindrical part of the locking element, and a recess to receive the abutment, a slot through a socket wall which separates the first socket opening and the recess, which socket wall is generally transverse to a longitudinal axis of the socket, the slot enabling the abutment to pass into the recess, the abutment providing a first bearing surface and a first face of the socket wall which bounds the recess providing a second bearing surface.

The locking element may have a shoulder between the second cylindrical part and the intermediate formation, which engages with a further face of the socket wall which bounds the first generally cylindrical socket opening, which shoulder and further face are urged together upon relative rotation between the first and second members, preferably by virtue of the first and second engagement surfaces providing a camming action between them during relative rotation of the first and second members.

If desired, the first face of the socket wall may have ratchet-like groove formations and the abutment may have a ratchet tooth formation which co-operates with the ratchet-like groove formations in a manner to inhibit rotation of the first and second members in a direction to release the engagement between the first and second engagement surfaces.

Preferably, in the second embodiment, the locking element has a pair of abutments which extend oppositely from the intermediate formation, each abutment having a first engagement surface, and the first face of the socket wall provides a second engagement surface for each abutment.

In each embodiment, the first member may comprise a rod or tubular member and the locking element may be provided as a separate element on or in an end of the member. The locking element may comprise a spigot which is received in the end of the first member with the cylindrical part and further cylindrical part for the first embodiment, or the abutment and cylindrical part for the second embodiment, projecting from the end of the first member.

The spigot may be secured in the end of the first member by fasteners or adhesive, but preferably the spigot of the locking element is a simple interference fit in the end of the first member.

The socket may be provided integrally with the second member, or the socket may be provided by a separate component attached to the second member.

In one application of the invention, the socket is provided by a second member comprising a sleeve to receive a first member, the sleeve providing a second socket for a further first member whereby the second member is a connector for connecting at least two first members together. For example, the two sockets of the sleeve may be provided so as to enable two first members to be connected end to end in alignment, or alternatively, the two sockets of the sleeve may be positioned so as to enable two first members to be connected together so as to extend transversly relative to one another.

In another application of the invention, the first or second member may comprise a tool head and the second or first member respectively, may comprise a handle for the tool head.

In yet another application of the invention, the first and second members may each have a passage therethrough and the locking element may also have a passage therethrough which communicates with each of the passages of the first and second members. Thus the locking element may permit fluid to flow from the first to the second member. Any desired sealing means may be provided to ensure fluid tightness of the connections.

It will be appreciated that to enable the locking element to rotate in the socket, some clearance is initially required between them. The force exerted by the cam surface on the inside surface of the socket in the first embodiment, or of the abutment on the socket wall in the second embodiment, can result in some misalignment of the first and second members after relative rotation between them. In some applications, some misalignment is undesirable. For example, where the first or second member comprises a handle and the second or first member a tool head, misalignment in some directions may not be so undesirable as a misalignment in another direction.

Preferably therefore, the relative orientation of the socket relative to the second member and/or the orientation of the locking element relative to the first member is arranged so that after relative rotation of the first member relative to the second member, the first and second members are aligned in a predetermined relative orientation.

Alternatively, where exact alignment is critical, for example, where the first and second members are both elongate members, and a securing means of the type of the first embodiment is employed, the axes of the first and second socket openings may be misaligned with any longitudinal axis of the second member and/or the axis of the first generally cylindrical part which provides the cam surface may be misaligned with the axis of the first member and/or the further cylindrical part, so that prior to relative rotation, the axes of the first and second members are misaligned, but during relative rotation the axes are brought into alignment.

The material from which the first and second engagement surfaces are made may be chosen to achieve a good friction fit when the elongate member is rotated. For example, both the first and second engagement surface may comprise a plastic material, or one surface may comprise wood and the other surface may comprise a plastics covered metal. However any other suitable combination of materials may be chosen.

If desired, in each embodiment, in order to provide a permanent connection between the first and second members, the securing means may have means to prevent relative rotation of the first and second members when secured together.

BRIEF DESCRIPTION OF THE DRAWINGS

The invention will now be described with the aid of the accompanying drawings, in which:

FIG. 1 is an exploded perspective diagrammatic view of a first embodiment of a securing means in accordance with the invention and, FIG. 1a is an enlarged view of the socket of the securing means of FIG. 1;

BRIEF DESCRIPTION OR THE PREFERRED EMBODIMENTS

Referring first to FIGS. 1, 1a, 1b and 2, the invention is applied to a tool head comprising a broom head 10, and a handle 11 which in the present example comprises a plastic covered welded steel tube. The handle 11 comprises a first member and has received in the end 12 thereof, a locking element 13 comprising a generally cylindrical part 14 which, as will be hereinafter explained, provides a first engagement surface 15 which is a cam which, in use, is urged into contact with an inside surface of a socket 16 provided in or on the broom head 10. The cross section of the locking element 13 can be seen clearly from FIG. 2.

Figures 1, 1A:
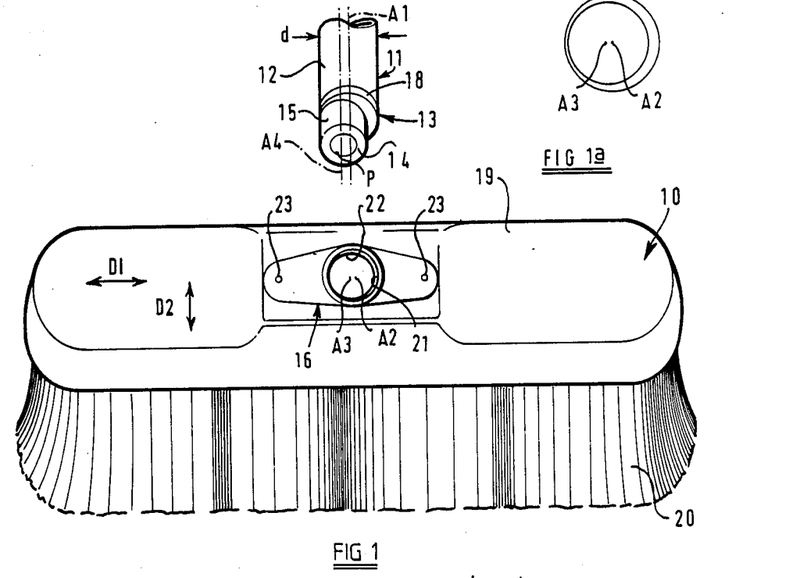
Figure 2:
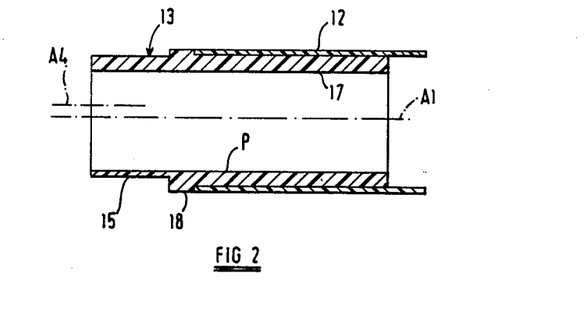
FIG. 2 is a cross sectional view of a locking element and first member for use in the securing means of FIG. 1.

The locking element 13 has a spigot 17 which is an interference fit into the end 12 of the tubular handle 11, and has a collar 18 which abuts the peripheral edge of the tubular handle 11.

The locking element 13 is made from a plastics material by an injection moulding process but could be otherwise made as required, and comprises a tubular fitting having an internal through passage P, although if desired could be a solid fitting.

The handle 11 is elongate and has a central longitudinal axis A1 which is aligned with a longitudinal axis of spigot 17 and the collar 18 which collar comprises a further generally cylindrical part of the locking element 13.

The generally cylindrical part 14 also has a longitudinal axis A4 which is spaced from axis A1.

The broom head 10 has a body 19 to which bristles 20 are attached as is well known in the art.

The body 19 has a socket 16 secured thereto by fasteners 23, which pass through a base 24 of the socket 16. The socket 16 presents a first socket opening 21 which is of generally cylindrical configuration having a slightly greater internal diameter d' (see FIG. 2) than the external diameter of the tubular handle 11 indicated at d, which in turn is of substantially the same diameter as the collar 18 of the locking element 13.

The first socket opening 21 of the socket 16 has a first longitudinal axis A2 which, during assembly of the handle 11 and the broom head 10 as explained hereinafter, remains generally aligned with axis A1 of the collar 18 of the locking element 13.

The socket 16 has a second socket opening 22 again of generally cylindrical configuration, but whose axis A3 is spaced form the axis A2.

To assemble the handle 11 and broom head 10, the part 14 of the locking element 13, collar 18 and the adjacent end 12 of the tubular handle 11 are received within the socket 16 such that the part 14 is received in the second socket opening 22, with its axis A4 generally aligned with axis A3 of the socket opening 22, and the axis A1 of the handle 11 being generally aligned with the axis A2 of the first socket opening 21.

The handle 11 is then rotated about axis A1 through less than one revolution and preferably less than half a revolution. This will cause the cam surface 15 of part 14 of the locking element 13 to move radially outwardly relative to axis A1 into close frictional engagement with the inside surface of the second socket opening 22 which provides a second engagement surface, thus securing the handle 11 relative to the broom head 10.

The axes A1 and A2 remain generally in alignment during this rotation although part of the external surface of end 12 of the handle 11 and the collar 18 will be urged into contact with the internal surface of the first socket opening 21 at a position opposite to the position of contact of the cam surface 15 with the inside surface of the second socket opening 22.

In the present example, the broom head 10 is made of wood, but could in another example be made of plastic. The socket 16, instead of having a base 24 to enable the socket 16 to be secured to the broom head 10, may be provided integrally in the broom head 10, for example by counterboring the wood head 10, or by suitable moulding the head and socket, where plastic.

As mentioned above, some clearance is required between, on the one hand, the side surfaces of the end 12 of the end 12 of the handle 11 and the collar 18, and on the other hand the inside surface of the socket opening 21 to enable the part 14 and end 12 of the handle 11 and the collar 18 to be received in the socket 16.

The force exerted by the cam surface 15 on the inside surface of the second socket part 22 after relative rotation, will cause some slight misalignment between the axes A1 and A2 i.e. the handle 11 will cant slightly relative to the broom head 10.

Such canting is undesirable but its effect can be minimised as follows.

It will be appreciated that canting of the handle 11 in a direction indicated at D1 in FIG. 1, would be immediately obvious to a user of the broom as the axis A1 of the handle 11 will be inclined relative to the lateral extent of the broom head 10 at other than a right angle. However canting in the direction indicated at D2 would not be readily noticeable by a user of the broom because the axis A1 of the handle 10 is in any case conventionally canted in this direction to enable the maximum bristle area to contact the ground with the handle 11 at a convenient angle.

Accordingly, by arranging the offset of axes A2 and A3 to lie transversly of the direction D2, upon rotation of the handle 11 relative to the broom head 10, the handle will be canted in a direction D2 as required.

Accordingly it is necessary in any application where this canting would be important, to ensure that the orientation of the socket openings 21,22, relative to the broom head 10 or other second member, are selected so that the final handle or other first member position and direction of cant is in the least undesirable direction.

In another embodiment which is not shown, where the alignment of axes A1 and A2 after relative rotation is critical, for example where instead of a broom head and handle, both members comprise elongate members, the axes A2, A3 of the locking element of one member may be relatively inclined to the longitudinal axis of the one member, so that after rotation, the other member extends in a desired predetermined direction relative to the one member, or alternatively the axis A4 may be inclined relative to axis A1 initially to achieve the same effect. However again the orientations of the socket parts 21,22, may need to be carefully selected.

Thus the axes A1 and A2 would only become aligned during relative rotation of the first and second members but initially would be slightly misaligned.

Figures 1B, 3:
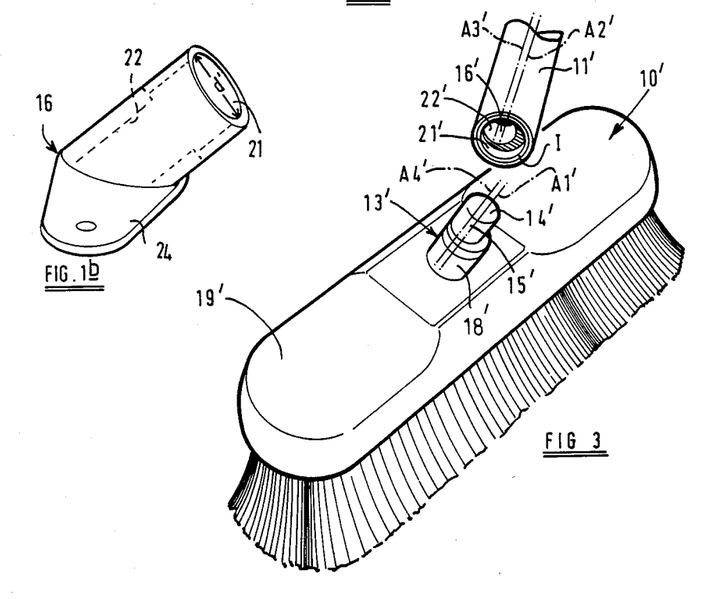
FIG. 1b is a perspective view of a socket of the securing means of FIG. 1.
FIG. 3 is an exploded diagrammatic perspective view of an alternative embodiment of the invention.

Referring now to FIG. 3, a similar but alternative arrangement is shown, but the locking element 13' instead of being provided as a fitting in the end of the handle 11', is moulded integrally with broom head 10' which in this example is made of a plastics material. Part of the locking element comprises an elongate first member. Thus the locking element 13' projects from body 19' of the broom head 10'.

Otherwise, locking element 13' is similar in configuration to locking element 13 shown in FIG. 1, the locking element 13' having a generally cylindrical part 14' which provides a cam surface 15' and is centered along an axis A4' and a further generally cylindrical part 18' integral therewith, centered on another axis A1'. Provided within the end of handle 11' is a socket 16' which comprises a first socket opening 21' of generally cylindrical configuration having an axis A2', and a second socket opening 22' having an axis A3'.

To assemble the handle 11' with the broom head 10', the locking element 13' is received within the socket 16' such that the first part 14' is received within the second socket opening 22' with the axis A4' generally aligned with axis A3' and with the further part 18' of the locking element 13' being engaged within the first socket opening 21' with the axis A1' generally aligned with axis A2', then the handle 11' is rotated through less than one revolution relative to the broom head 10', so that the cam surface 15' of the part 14' of the locking element 13' is moved radially outwardly from axis A1' and is urged into contact with the inside surface of the second socket opening 22'. Also at an opposite position, the part 18' of the element 13' is urged into contact with the inside surface of the first socket opening 21'.

It will be appreciated that in this alternative arrangement, the socket 16' is preferably provided by a plastic insert 1 received within the end of the handle 11' as the handle 11' is tubular, but could be provided by counterboring where the handle is solid.

Again, it is important to ensure that the axes A4', A1' are in an orientation such that when the handle 11' is engaged with the locking element 13' the final direction of cant of the handle 11' is in the least undesirable direction.

The locking element 13' in this alternative arrangement, is a solid moulding, i.e. there is no central passage such as passage P shown in FIG. 1.

In both arrangements described so far, in place of the handles 11,11', being provided by tubes, if desired the handles may comprise solid rods.

Figure 4:
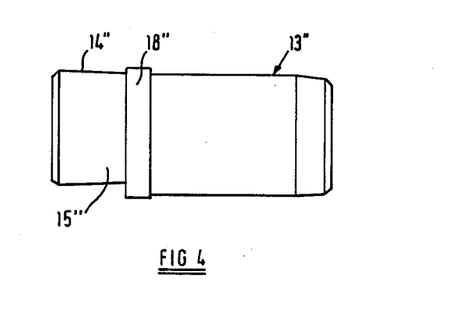
FIG. 4 is a side view of a modified locking element for use in the securing means of FIG. 1.
Figure 5:
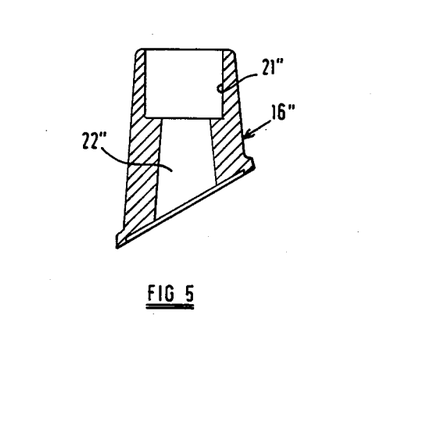
FIG. 5 is a cross-sectional view of a socket for use with the modified locking element of FIG. 4.

FIGS. 4 and 5 illustrate a modification which may be employed particularly with the arrangement of FIGS. 1, 1a, 1b, and 2, although the modification may be adapted with the arrangement with reference to FIG. 3.

Referring first to FIG. 4, a locking element 13" is modified in that the cylindrical surface 15" which provides the cam surface on generally cylindrical part 14" is tapered slightly in this embodiment in the order of half a degree, so that the diameter of the part 14" reduces slightly in a direction towards collar 18". Otherwise the locking element 13" is identical to that shown in FIGS. 1 and 3.

In FIG. 5 it can be seen that the inside surface of the second socket opening 22" is also slightly tapered, again in the order of half a degree, so that the diameter of the second socket opening 22" reduces slightly in a direction towards the first socket opening 21".

These slightly tapered surfaces co-operate when the handle is locked into position, the taper of the second socket part 22" providing an undercut.

Of course, if desired, a taper of a different angle could be provided, for example up to 3°.

It has been found that such a modification considerably improves the performance of the securing member in the following respect.

It will be appreciated that the locking element and socket of the FIGS. 1 to 3 arrangements, are maintained in engagement solely by friction between lateral walls which are generally parallel with the axes of the locking element and socket part so that a force is exerted between the walls generally transversly relative to the axes A3,A4. Although a large resistance to pull out can be achivied with such an arrangement, by providing the undercut on the second socket part 22" and the taper on the cylindrical surface 15" as described with reference to FIGS. 4 and 5, resistance to pull out is considerably increased as a force is exerted having a component generally parallel to the axes.

It will be appreciated that the modification can be applied to the FIG. 3 embodiment by again ensuring that the diameter of the surface 15' of the cylindrical part 14'and the diameter of the second socket opening 22" of the first and second members 10' and 11' respectively, decrease in a direction away from the second and first member 11', 10' respectively.

Figure 6:
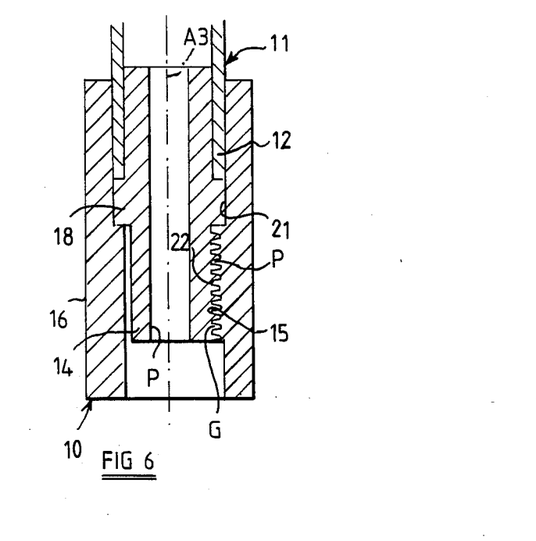
FIG. 6 is a diagrammatic cross sectional view through a securing means similar to that shown in FIG. 1 but modified.

In place of the undercut and taper, any other means to enable a frictional force to be imposed in a direction generally parallel to the axes of the second socket opening and the cylindrical part may be provided, such as a laterally extending lug or abutment on the locking element or in the second socket opening which engages with a corresponding groove in the socket or locking part respectively. Referring now to FIG. 6, an arrangement similar to that shown in FIGS. 1 and 2 is illustrated, and like parts are indicated by the same reference numerals. In this arrangement, in which the cam surface 15 is shown in engagement with the inside surface of the second socket opening 22, the cam surface 15 has a plurality of circumferentially extending projections P which extend outwardly. Prior to relative rotation of the first 11 and second 10 members (the second member is again a tool head but is not seen at large), the projections P will be clear of the inside surface of the socket opening 22, but upon rotation as the cam surface 15 moves outwardly relative to the axis A3 to the position shown, the projections P will engage the inside surface of the socket opening 22.

However, the inside surface has grooves G to receive the projections P in positions corresponding to the positions of the projections, upon relative rotation between the first and second members. This co-operation between the projections P and grooves G provides added resistance to withdrawal of the handle 11 from the socket 16 and resists rotation of the first member 11 relative to the second member 10 to release the engagement between the cam surface 15 and inside surface of the socket opening 22.

Of course, if desired, a contrary arrangement may be provided with projections on the inside surface of the socket opening 22 which engage with grooves provided in the cam surface 15.

Figures 7, 8:
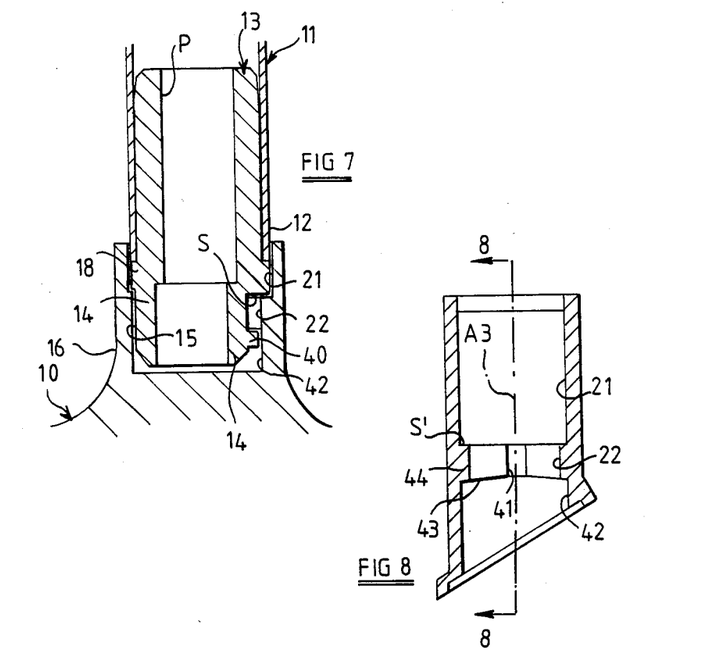
FIG. 7 is a diagrammatic cross sectional view through a still further securing means similar to FIG. 1, but modified.
FIG. 8 is an alternative view of the socket of the securing means of FIG. 7.

Referring now to FIGS. 7 and 8, a further modified arrangement is shown. Again similar parts to the FIGS. 1, 1a, 1b and FIG. 2 arrangements are indicated by the same reference numerals.

In this embodiment, the locking element 13 has an outwardly extending abutment 40 circumferentially spaced from the cam surface 15 on the first cylindrical part 14. The socket 16 has, in the second socket opening 22, a groove 41 which communicates with a recess 42 longitudinally spaced from the first and second socket openings 21,22.

The groove 41 permits the abutment 40 pass into the recess 42 prior to the relative rotation between the first and second members 11,12.

Upon relative rotation between the first 11 and second 12 members, the abutment 40 is free to rotate in the recess 42 and engages with an auxiliary cam surface 43 provided by a face of a radially inwardly extending socket wall 44 which bounds the recess 42. It can be seen that the abutment 40 and face 43 provide a camming action between them during the relative rotation of the first and second members 11,12, because the face 43 slopes as the radial distance from axis A3 of the socket opening 22 towards the side walls of the socket 16 increases.

This camming action urges a shoulder S between the first and second cylindrical parts 14,18, of the locking element 13 into increasingly tight engagement with a corresponding shoulder S' between the first and second socket openings 21,22. Along with engagement between the cam surface 15 and the inside surface of the socket opening 22, considerable resistance to withdrawal of the first member 11 from the socket 16 is achieved.

It will be appreciated that in order for the first and second members to become disengaged, the abutment 40 would again need to be aligned with the groove 41 and this would require the abutment 40 to release face 43, which movement would be resisted by the engagement between the cam surface 15 and the inside surface of socket opening 22.

In an alternative arrangement, the auxiliary cam surface 43 may slope in an opposite direction to that shown in FIG. 8 of the drawings i.e. so the thickness of socket wall 44 decreases as the radial distance from axis A3 increases. In this event, as the cam surface 15 moves outwardly upon relative rotation of the first and second members 11,12, the abutment 40 will not engage the surface 43 more tightly, although the abutment 40 will tend to be drawn into contact with the surface 43 by virtue of the tendency of the locking element 13 to screw out of the socket 16.

To disengage the locking element 13 from the socket 16, the abutment 40 would thus need to move axially downwarly, as seen in FIGS. 7 and 8, in order to realign with the groove 41 which would of course tend to draw the locking element 13 further into the socket 16 which movement would be resistant by the engagement between cam surface 15 and the inside surface of the second socket opening 22.

If desired, more than one abutment could be provided alternatively and the surface 43 could simply be planar rather than sloping as described.

Figure 9:
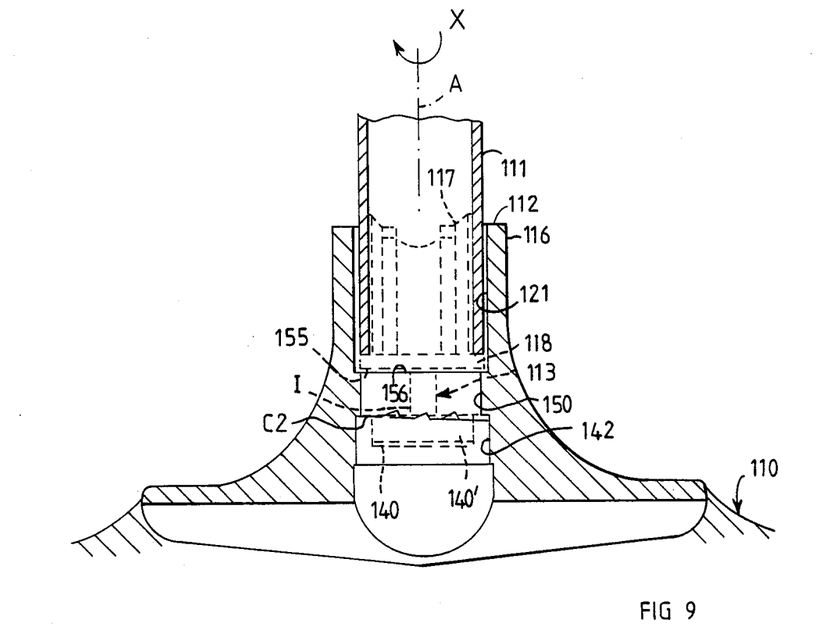
FIG. 9 is a diagrammatic cross sectional view through a second embodiment of a securing means in accordance with the invention.
Figure 10:
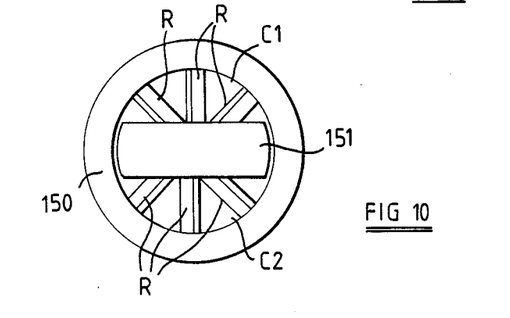
FIG. 10 is an underside plan view of part of the securing means of FIG. 9.
Figure 11:
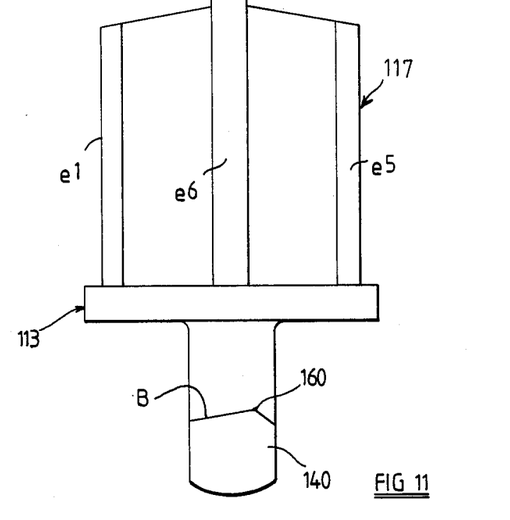
FIG. 11 is an enlarged side view of a locking element of the securing means of FIG. 9, and, FIG. 12 is a plan view of the locking element of FIG. 11.

Referring now to FIGS. 9 to 12, a second embodiment of the invention is shown. Like the arrangement of FIGS. 1 to 8, a connection between the first and second members 110,111, is achivied by virtue of a camming action between a locking element indicated at 113 and a socket indicated at 116. In FIG. 9, the locking element 113 is shown in dotted lines although a side view of the locking element is shown in FIG. 11.

Figure 12:
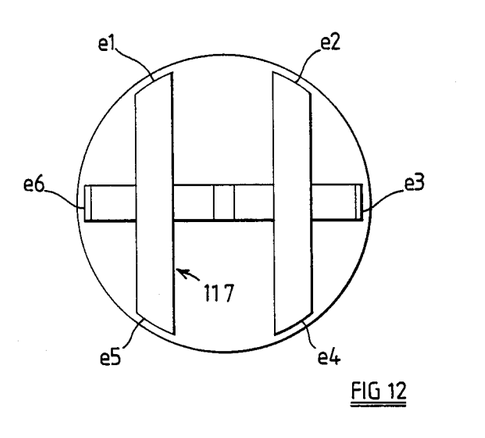

The locking element 113 is received in the end of a tubular first member 111 which is shown in full lines in FIG. 9 and comprises a spigot 117 which in this example comprises a generally H shaped extrusion, the configuration of which can be seen clearly from FIG. 12, which provides six edges $e_1, e_2, e_3, e_4, e_5$ and $e_6$ for engagement with the inside surface of the end 112 of the first member 111.

If desired, a spigot such as shown at 17 in FIG. 2 could alternatively be employed, or any other means for fixing the locking element 113 in on or at the end of the first member 111 or a spigot such as shown at 117 could be used to secure the locking element in the arrangements of FIGS. 1 to 8 in the end of the first member. For example, the spigot could be fastened or adhered in the end 112, although a simple interference fit, as with spigot 17 of FIG. 2, is preferred.

The locking element 113 comprises a pair of abutments 140 and 140' which extend oppositely from a central axis A of the locking element 113, the abutments 140 and 140' being connected to a cylindrical part 118 by an intermediate formation 1. The abutments 140, and 140' each provide a bearing surface B.

The socket 116 comprises a first generally cylindrical socket opening 121 which receives the end of the first member 111 and the cylindrical part 118 of the locking element 113.

Further, the socket comprises a recess 142, the socket opening 121 and recess 142 being separated by a socket wall which is indicated at 150.

The socket wall 150 has cut through it, a slot 151 of generally the same configuration as the abutments 140 and 140' so that the abutments 140 and 140' may be passed downwardly through the slot 151 into the recess 142.

The underside of the socket wall 150 provides a pair of cam bearing surfaces C1 and C2. Engagement between the locking part 113 and the socket 116 is adapted in this example to take place upon a clockwise rotation of the first member relative to the second member, looking down into the socket 116, as shown by arrow X. Thus the abutment 140, when the first member is rotated relative to a second member 110 to which socket 116 is attached, will move over the surface C2, and abutment 140' will move over the surface C1.

It can be seen from FIG. 10 that the surface C2 slopes so that the thickness of the socket wall 150 adjacent the position where abutment 140 lies prior to rotation, is a minimum thickness, and similarly, surface C1 slopes, but oppositely, so that the thickness of the wall 150 at a position where the abutment 140' lies prior to rotation is of a minimum thickness.

However, as the first member 111 is rotated relative to the second member in a clockwise direction, as shown by the arrow X in FIG. 9, the abutment 140 will ride on the cam surface C2, and the abutment 140' will ride on the cam surface C1, performing a camming action as the thickness of the socket wall 150 for each abutment 140, 140' increases as the abutments move.

Thus a shoulder 155 comprising the face of the collar 118 adjacent the intermediate formation 1 will become increasingly tightly engaged with an upper surface 156 of the socket wall 150. In this respect, the shoulder 155 comprises a first engagement surface and the surface 156 a second engagement surface of the socket which surfaces are urged together by the camming action of the abutments 140 and 140' on their respective camming surfaces C2 and C1.

To assist in inhibiting contra-rotation of the first member 111 relative to the socket 116, the cam surffaces C1 and C2 are each provided with a series of ratchet grooves R. It can be seen from FIG. 11 that the abutments 140 and 140' each have a ratchet tooth 160 which rides on the respective cam surface C2 or C1, and this tooth 60 will locate in the respective ratchet grooves R as the first member 111 is relatively rotated.

Because of the configuration of the groove R and teeth 160, the first member 111 will be generally free to rotate in the direction of arrow X relative to the socket 116, but will be prevented or restrained from rotating in an opposite direction which would release the engagement between the abutments 140,140' and their respective cam surfaces C2,C1.

Of course many modifications may be made to the embodiment shown with reference to FIGS. 9 to 12, without departing from the scope of the invention. For example, if desired, the ratchet grooves G and tooth 160 need not be provided.

Instead of a pair of abutments 140 and 140' on the locking element 113 which extend oppositely outwardly, a single abutment only may be provided if required, in which case only a single cam surface C1 or C2 would be required.

In such an event, the configuration of the slot 151 through the socket wall 150 could be modified to simply allow the single abutment to pass into the recess 142.

In this modification, problems of undesirable cant of the first member 111, relative to the socket 116 and second member could be encountered, and thus, as described with particular reference to the first embodiment, either the socket 116 and/or the locking element 113 may be adapted to minimise the effect of such cant.

In place of the ratchet grooves R and ratchet tooth 160 described, alternative means for inhibiting rotation of the first member relative to the second member to release the first member from engagement with the second member, could be provided.

For example, ratchet means may be provided between the surfaces 155 and 156.

A rachet arrangement may be provided in relation to the arrangements of FIGS. 1 to 8, to inhibit rotation of the first member relative to the second member after the members have been secured together.

In each of the embodiments described, it will be appreciated that a range of tool heads each having a socket or projecting locking element, may be used in conjunction with a single handle, or vice versa a range of handles of different lengths for example, or of other configurations, may be used with a single, or a range of, tool heads.

In the FIG. 1 embodiment, the socket 16 may be provided integrally or attached to the broom head 10, as described.

Also in the FIG. 1 embodiment, the locking element 13, instead of comprising a separate part may be integrally formed with the handle and made by swaging the tube 11, or turning the handle where the handle is a solid rod.

In the embodiment of FIGS. 9 to 12, if desired the abutments 140,140' may be provided within a socket, the abutments passing through a slot in a wall of the locking element.

Although as described, the invention has been applied to a means for securing a handle 11,11',111, to a broom head 10,10',110, it will be appreciated that the securing means may be used to secure any other tool head to a handle, each an a rako or other garden tool, paint roller or window cleaner, to a handle.

The handles may be made of wood, plastic or metal, or other materials and may be solid or hollow, and the broom head, or other tool head may be made in alternative materials to wood and plastic if required.

In one arrangement, where the tool head comprises a garden tool such as a spade or fork or another tool which already has a socket to receive a handle, a locking element with a spigot may be provided, the spigot being received in the socket of the tool with at least the cam surface and adjacent cylindrical part of the locking element (as in FIGS. 1 to 8) or the abutments and cylindrical part (as in FIGS. 9 to 12) extending from the tool or axially within a socket of the tool, for engagement with a socket of a handle.

To prevent the penetration of water and dirt into the socket 16,16',116, a sheath may be provided around the handle 11,11',111, which covers the end of the socket.

Instead of a tool head, the second member may comprise a fitting such as a two, three, four, five or six way connector, having sockets to enable a corresponding number of first members to be connected thereto, or another elongate element such as a tube or solid rod which provides a socket. In this latter respect the second member may comprise a sleeve having a socket at each end to enable an elongate member such as a rod or tube to be connected at either end. Thus the invention is applicable not only to handles and tool heads, but also for example, elongate elements of display systems, drain rods, furniture components, support legs of storage systems/heavy racking systems, the legs of playing equipment such as swings, climbing frames, greenhouse frames, scaffolding and stagins supports, tubular fencing, street furniture such as signposts, radio masts, rotary clothes lines, umbrella sunshades, stands for loudspeakers, frameworks for construction e.g. carports, items which need suspending, e.g. spotlights, couplings for tubes such as electrical conduit, or tubes through which fluid may pass such as sprinkler systems.

In the latter respect, to ensure fluid tightness, a sealing means may be provided such as an O ring, which ring may be provided for example in the FIG. 1 embodiment. in annular groove in the further generally cylindrical part 18 of the locking element 13, i.e. collar, where provided, but preferably on the exterior surface of the end of the first member 12, where the end of the first member is received in the socket 16. Alternatively the O ring may be provided in a groove on the inside surface at the first socket part 21.

Any other sealing means may alternatively be provided.

Where the invention is to applied to, for example, furniture legs or otherwise where a permanent connection is desired, adhesive may be use between the first and second engagement surfaces of the securing means to permanently secure first and second members of the securing means together. In each of the embodiment described, the end 12,12',112 of the first member 11,11',111, adjacent the body part 13,13', 113, has been received in the socket 16,16',116. If desired, the respective collars 18,18',118, may extend further longitudinally of the first member so that the end 12,12',112 of the member 11,11',111, does not need to be received in the socket 16,16',116.

I claim:

1. A securing means for securing together first and second members, the first member being elongate and having a generally central longitudinal axis, the second member having a socket, the first member having first and second engagement surfaces which are receivable in the socket, the socket having co-operating first and second engagement surfaces, the first engagement surfaces cooperating to guide the first and second members for relative rotation about said axis, while the second surfaces, upon less than one revolution of the first member bout said axis, relative to the second member, are being urged into contact to exert a transverse force between the second engagement surfaces in a direction transverse to said axis and the first and second members having means to exert a generally axial force therebetween in a direction generally parallel to said axis as a result of said relative rotation to secure the firt and second members together.

2. A securing means according to claim 1 wherein the first member comprises an abutment longitudinally spaced from the second engagement surface of the first member, the abutment projecting outwardly of the region of the first member from which it projects and the second engagement surface of the socket having, in a position corresponding to the position of the abutment prior to relative rotation of the first and second members, a longitudinally extending groove to enable the second cylindrical part of the first member to be received in the second socket opening, and the socket providing a recess longitudinally spaced from the first socket opening and communicating with the groove to receive the abutment when the second cylindrical part is received in the second socket opening, whereby upon said relative rotation of the first and second members, the abutment becomes misaligned with the groove.

3. A securing means according to claim 2 wherein the socket between the second socket opening and the recess, provides an auxiliary cam surface with which the abutment engages during relative rotation of the first and second members to urge the first member longitudinally inwardly of the socket.

4. A securing means according to claim 1 wherein the first member comprises a main part comprising a tubular member and a secondary part comprising a locking element provided as a separate element at an end of the member, the locking element providing at least the second engagement surface of the first member.

5. A securing means according to claim 1 wherein the socket comprises a first generally cylindrical socket opening which provides said first engagement surface and a second generally cylindrical socket opening having a longitudinal axis spaced from the longitudinal axis of the first socket opening which provides the second engagement surface.

6. A securing means according to claim 5 wherein the first member comprises a first generally cylindrical part having a longitudinal axis generally aligned with said axis of the first member and which provides the first engagement surface and a second generally cylindrical part having a longitudinal axis aligned from the longitudinal axis of the first member and which provides the second engagement surface, the second engagement surface comprising a cam to engage the second engagement surface of the socket upon said relative rotation of the first and second members.

7. A securing means according to claim 6 wherein the first and second members comprise elongate members and wherein at least one of
   (a) the axis of at least one of the first and second socket members is misaligned with the longitudinal axis of the second member,
   (b) the axis of the second cylindrical part which provides the cam surface is misaligned with at least one of the axis of the first member and the first cylindrical part,
so that prior to relative rotation the axis of the first and second members are misaligned, but during relative rotation the axis are brought into alignment.

8. A securing means according to claim 1 wherein interengaging teeth are provided between opposed surfaces of the first and second members to restrain relative rotation of the first and second members when secured together.

9. A securing means according to claim 3 wherein a shoulder is provided between the first and second cylindrical parts of the first member and is urged into increasingly tight engagement with a radially inwardly extending formation of the socket between the first and second socket openings during relative rotation between the first and second members, by virtue of the engagement between the auxiliary cam surface and the abutment.

10. A securing means according to claim 6 wherein the second engagement surfaces of the first member and the socket are tapered at an angle of up to 3° relative to the longitudinal axis of the second cylindrical part and of the second socket opening respectively.

11. A securing means according to claim 1 wherein the locking element has a first part comprising an abutment which extends generally transversly to the central longitudinal axis of the first member, and a second generally cylindrical part, an intermediate formation connecting the first and second parts, the socket comprising a first generally cylindrical socket opening which receives the second generally cylindrical part of the locking element, and a recess to receive the abutment, a slot through a socket wall which separates the first socket opening and the recess, which socket wall is generally transverse to a longitudinal axis of the socket, the slot enabling the abutment to pass into the recess, the abutment providing a first bearing surface and a first face of the socket wall which bounds the recess providing a second bearing surface.

12. A securing means according to claim 11 wherein the locking element has a shoulder between the second cylindrical part and the intermediate formation, which engages with a further face of the socket wall which bounds the first generally cylindrical socket opening, which shoulder and further face are urged together upon relative rotation between the first and second members and a securing means according to claim 8 wherein the first face of the socket wall has ratchet-like groove formations and the abutment has a ratchet tooth formation which co-operates with the ratchet like groove formations in a manner to inhibit rotation of the first and second members in a direction to release the engagement between the first and second engagement surfaces.

13. A securing means according to claim 1 wherein one of the first and second members comprises a tool head and the other of the second and first member respectively, comprises a handle for the tool head.

14. A securing means according to claim 6 wherein one of the second engagement surfaces of the first member and the socket comprises at least one projection which extends laterally, relative to the longitudinal axis of the second generally cylindrical partt of the first member, which projection is received in a corresponding groove in the other second engagement surface as the first and second members are relatively rotated.

* * * * *